(12) United States Patent
Fukushima et al.

(10) Patent No.: US 6,423,247 B1
(45) Date of Patent: Jul. 23, 2002

(54) PHOSPHORESCENT PIGMENT AND PROCESS FOR PREPARING THE SAME

(75) Inventors: Mizue Fukushima, Tokorozawa; Hiroshi Hirashima, Tokyo; Hiroaki Imai, Yokohama; Oh Junrok, Kawasaki, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/341,257

(22) PCT Filed: May 19, 1997

(86) PCT No.: PCT/JP97/01671

§ 371 (c)(1),
(2), (4) Date: Jul. 16, 1999

(87) PCT Pub. No.: WO98/53025

PCT Pub. Date: Nov. 26, 1998

(51) Int. Cl.[7] ........................... C09K 11/64; C09K 11/55
(52) U.S. Cl. ............................................. 252/301.4 R
(58) Field of Search ................... 252/301.4 R, 301.4 P, 252/301.4 H, 301.5, 304.6 R, 301.6 H, 301.6 S (56) References Cited

U.S. PATENT DOCUMENTS

| | | | |
|---|---|---|---|
| 5,202,777 A | * | 4/1993 | Sluzky et al. ......... 252/301.4 R |
| 5,376,303 A | | 12/1994 | Royce et al. ......... 252/301.4 R |
| 5,424,006 A | * | 6/1995 | Murayama et al. ... 252/301.4 R |
| 5,637,258 A | * | 6/1997 | Goldburt et al. ...... 252/301.4 R |
| 5,893,999 A | * | 4/1999 | Tamatani et al. ..... 252/301.4 R |
| 6,013,199 A | * | 1/2000 | McFarland et al. ... 252/301.4 R |

FOREIGN PATENT DOCUMENTS

| | | | |
|---|---|---|---|
| EP | 415469 | * | 3/1991 |
| JP | 59-138291 | | 8/1984 |
| JP | 3-142286 | | 6/1991 |
| JP | 3-149286 | * | 6/1991 |
| JP | 4-68077 | | 3/1992 |
| JP | 4-120189 | | 4/1992 |
| JP | 7-11250 | | 1/1995 |
| JP | 9-111236 | | 4/1997 |

* cited by examiner

Primary Examiner—C. Melissa Koslow
(74) Attorney, Agent, or Firm—Finnegan, Henderson, Farabow, Garrett & Dunner, L.L.P.

(57) ABSTRACT

A light-storing fluorescent pigment comprising a mother crystal and a rare earth element with which said mother crystal is doped, characterized in that said light-storing fluorescent pigment is produced by calcining a gel powder, as a starting material, obtained from an arbitrary combination of an alkoxide derivative, an organic acid salt, an inorganic acid salt, an oxide and a chloride of metal elements constituting said pigment by using a sol-gel method. A simplified production process can be used and the resulting light-storing fluorescent pigment has high crystal purity, is free from contamination with impurities and it is possible to easily control the particle diameter of the pigment.

6 Claims, 8 Drawing Sheets

PHOSPHORESCENT PIGMENT AND PROCESS FOR PREPARING THE SAME

TECHNICAL FIELD

The present invention relates to a light-storing fluorescent pigment and, more particularly, to a light-storing fluorescent pigment containing a mother crystal doped with a rare earth metal.

The light-storing fluorescent pigment of the present invention can be advantageously used as a display means of various apparatuses, measuring instruments and members because of its excellent light emitting characteristics, easy production, lack of contamination with impurities and ease of control of the particle diameter of pigment particles. The present invention also relates to a method of producing such a light-storing fluorescent pigment. As recognized in this technical field, the "light-storing fluorescent pigment" refers to a fluorescent pigment capable of maintaining afterglow enough to be visually recognized for a time of from tens of minutes to several hours even after the termination of stimulation when light is emitted by stimulating the pigment using ultraviolet radiation.

BACKGROUND ART

Various light-storing fluorescent pigments have been suggested and can be actually purchased and used. Among them, a popularly used light-storing fluorescent pigment is a zinc sulfide-based light-storing fluorescent pigment, that is, those obtained by adding a radioactive substance to a zinc sulfide-based fluorescent substance (ZnS:Cu) to enhance the light-storing performance. This fluorescent pigment can emit light for a long time using the energy of the added radioactive substance. However, this fluorescent pigment has such a drawback that it is chemically unstable and is inferior in light resistance. Accordingly, its application is limited to a narrow range. Furthermore, this fluorescent pigment has such a drawback that production control is difficult and the amount is limited because a radioactive substance is contained.

To solve the problems of a conventional zinc sulfide-based light-storing fluorescent pigment, Japanese Unexamined Patent Publication (Kokai) No. 7-11250 suggests a light-storing fluorescent substance, which is characterized by using a compound represented by $MAl_2O_4$ (M is at least one metal element selected from the group consisting of calcium, strontium and barium) as a mother crystal, and adding europium as an activator and an element such as lanthanum as a coactivator. According to this invention, there can be obtained a light-storing fluorescent substance which has afterglow characteristics with high luminance for a time longer by far than that in the case of a commercially available sulfide-based fluorescent substance, and which is chemically stable and is also superior in light resistance. Since this light-storing fluorescent substance does not use a radioactive substance, the drawbacks caused by its use can be avoided.

U.S. Pat. No. 5,376,303 discloses a light-storing fluorescent substance comprising a composition represented by the following formula:

(wherein MO represents at least one divalent metal oxide selected from the group consisting of MgO, CaO, SrO and ZnO; and R represents Eu and at least one additional rare earth element selected from the group consisting of Pr, Nd and Tm, and the rare earth element is contained in the amount enough to enhance afterglow characteristics). Also according to this invention, the same effect as that of Japanese Unexamined Patent Publication (Kokai) No. 7-11250 described previously can be obtained.

By the way, problems to be solved are still present in these light-storing fluorescent substances free from radioactive substance. A first problem is a problem caused by using a solid state reaction method in the production of the light-storing fluorescent substance. That is, these light-storing fluorescent substances are usually produced by mixing a mother crystal, and an oxide, a halide or a carbonate of constituent elements as an activator and a coactivator, and calcining the mixture, but it is impossible to avoid that the resulting fluorescent substance is contaminated by a trace amount of impurities. Accordingly, characteristics of the fluorescent substance can vary largely. In other words, to avoid such a problem of contamination with impurities, purification of the oxide, halide or carbonate of constituent elements as a starting material and purification of the resulting fluorescent substance must be conducted carefully. Therefore, the production process is complicated.

Calcination for producing the light-storing fluorescent substance is conducted in the following procedure. That is, starting materials after purification are usually mixed by using a blender, a ball mill or the like, and then the resulting mixture is calcined under a reducing atmosphere. In the case where the mother crystal is an aluminate, the calcination must be conducted at high temperature of not less than about 1300° C. However, it is difficult to obtain a crystal having desired high purity, which is also a problem. It is generally desired that the calcination can be conducted at lower temperature and the resulting crystal has high purity, that is, the crystal is composed of a single phase.

After the completion of the calcination, the sintered product is ground by using a crusher, a ball mill or the like to obtain a powdered light-storing fluorescent substance. Since the light emitting characteristics and coating properties are influenced by the particle diameter of the light-storing fluorescent substance, it is necessary to classify for the purpose of removing coarse particles and fine particles after the completion of the grinding. In the solid state reaction method, the scatter in particle diameter is generally large and a tendency to form coarse particles is noticeable.

Furthermore, in the solid state reaction method used conventionally, a flux such as halide of an alkali or an alkali earth metal, boric acid, etc. is often used on calcination for the purpose of promoting crystal growth. Therefore, it is necessary to wash and dry for the purpose of removing the flux and impurities after classification.

In the light-storing fluorescent substance comprising a mother crystal doped with a rare earth metal, which is produced by a conventional solid state reaction method, various necessary conditions described below must be satisfied as described above. That is, a purification step before calcination is required; a flux to be removed in a washing step after calcination must be added in the system; high-temperature calcination is required to obtain a desired crystal form; a classification step is required because the particle diameter of the fluorescent substance obtained after calcination and grinding is not uniform; and a washing step for removing the flux and impurities is required.

DISCLOSURE OF THE INVENTION

An object of the present invention is to solve the above-described problems of the prior art and to provide a light-storing fluorescent pigment, which has high crystal purity and uniform particle diameter and is free from contamination with impurities, without requiring complicated production process and reaction conditions.

Another object of the present invention is to provide a light-storing fluorescent pigment capable of easily controlling the particle diameter and characteristics of the pigment.

Still another object of the present invention is to provide a method of producing such an improved light-storing fluorescent pigment according to demand.

These objects and other objects of the present invention will become apparent from the following detailed description of the present invention.

In one aspect, the present invention provides a light-storing fluorescent pigment comprising a mother crystal and a rare earth element with which said mother crystal is doped, characterized in that said light-storing fluorescent pigment is produced by calcining a gel powder as a starting material obtained from an arbitrary combination of an alkoxide derivative, an organic acid salt, an inorganic acid salt, an oxide and a chloride of metal elements constituting said pigment by using a sol-gel method.

In another aspect, the present invention provides a method of producing a light-storing fluorescent pigment comprising a mother crystal and a rare earth element with which said mother crystal is doped, which comprises the steps of:

producing a gel powder from an arbitrary combination of an alkoxide derivative, an organic acid salt, an inorganic acid salt, an oxide and a chloride of metal elements constituting said pigment by using a sol-gel method; and calcining the resulting gel under a reducing atmosphere.

In the present invention, as is apparent from the following description, not only a complicated production process required for solid state reaction can be simplified, but also a light-storing fluorescent pigment with a desired crystal form and composition, which has high purity and uniform particle diameter, can be obtained.

MODE FOR CARRYING OUT THE INVENTION

The light-storing fluorescent pigment according to the present invention comprises a mother crystal and a rare earth metal with which the mother crystal is doped. The doping of the mother crystal with the rare earth element can be conducted by various procedures, but is preferably conducted by using an activator and a coactivator. If necessary, other additional elements may also be used, in addition to these additives.

In the light-storing fluorescent pigment of the present invention, the mother crystal is preferably a metal oxide-based crystal comprising at least two metal elements selected from the group consisting of aluminum, strontium, calcium and barium. Suitable metal oxide-based crystal is not limited, but includes, for example, $SrAl_2O_4$, $SrAl_4O_7$, $CuAl_2O_4$, $Sr_xBa_{(1-x)}Al_2O_4$, $Sr_xCa_{(1-x)}Al_2O_4$, $Sr_xBa_{(1-x)}Al_4O_7$, $Sr_xCa_{(1-x)}Al_4O_7$, $SrAl_{12}O_{19}$, $Sr_2Al_2O_6$ or the like. The raw material used for formation of these mother crystals will be described in detail below, but is preferably in the form of an alkoxide derivative, an organic acid salt, an inorganic acid salt, an oxide, a chloride or the like. One example of a suitable raw material used herein includes barium carbonate, strontium carbonate, aluminum tri(2-butoxide), strontium di(2-propoxide), strontium acetate, aluminum oxide, strontium chloride, strontium nitrate or the like.

Although the doping of this mother crystal with the rare earth element is derived from use of the activator and coactivator as described above, the activator, which can be advantageously used, is preferably europium. Europium is added in the form of an alkoxide derivative, an organic acid salt, an inorganic acid salt, an oxide, a chloride or the like, but is preferably added in the form of the oxide such as europium oxide ($Eu_2O_3$). The concentration of the activator to be added to the mother crystal can vary widely depending on various factors such as the composition and the characteristics of the desired pigment, but is preferably within a range from about 0.05 to 10% by weight, and more preferably from about 0.1 to 5% by weight.

The coactivator, which can be advantageously used in combination with the activator, is preferably at least one element selected from the group consisting of lanthanum, cerium, praseodymium, neodymium, samarium, gadolinium, terbium, dysprosium, holmium, erbium, thulium, ytterbium and lutetium. These coactivators are added in the form of an alkoxide derivative, an organic acid salt, an inorganic acid salt, an oxide, a chloride or the like and are preferably added in the form of the oxide such as dysprosium oxide ($Dy_2O_3$), neodymium oxide ($Nd_2O_3$), cerium oxide ($Ce_2O_3$), holmium oxide ($Ho_2O_3$), terbium oxide ($Tb_2O_3$) or the like. The concentration of the coactivator to be added to the mother crystal can vary widely depending on various factors such as composition and characteristics of the desired pigment, concentration of the activator, etc., but is preferably within a range from about 0.02 to 10% by weight, and more preferably from about 0.05 to 5% by weight.

When the present invention is carried out, at least one of other additional elements may be added in combination with the activator and coactivator. Use of the additional element is particularly effective for further reduction in calcinations temperature, improvement in luminance and improvement in afterglow characteristics. A suitable additional element used herein is not limited, but includes, for example, boron, copper and phosphorus. Similar to the above-described constituent elements, these additional elements are also added in the form of an alkoxide derivative, an organic acid salt, an inorganic acid salt, an oxide, a chloride or the like and are preferably added in the form of the alkoxide derivative and oxide, such as boron oxide ($B_2O_3$), triethoxyboron ($B(OC_2H_5)_3$), phosphorus pentaoxide ($P_2O_5$), copper oxide (CuO) or the like. The concentration of the additional element to be added to the mother crystal can vary widely depending on various factors such as composition and characteristics of the desired pigment, concentration of the activator and coactivator, etc., but is preferably within a range from about 0.01 to 10% by weight, and more preferably from about 0.1 to 8% by weight.

The light-storing fluorescent pigment according to the present invention is characterized by using a sol-gel method in place of a conventionally used solid state reaction method in the production, that is, an arbitrary combination of an alkoxide derivative, an organic acid salt, an inorganic acid salt, an oxide and a chloride of the above-described various metal elements constituting the fluorescent pigment of the present invention is used as a raw material and a gel powder prepared from these raw materials by using a sol-gel method is used as a starting material.

Accordingly, the method of producing the light-storing fluorescent pigment according to the present invention comprises the steps of:

producing a gel powder from an arbitrary combination of an alkoxide derivative, an organic acid salt, an inorganic acid salt, an oxide and a chloride of metal elements constituting the pigment by using a sol-gel method; and calcining the resulting gel under a reducing atmosphere.

In the practice of the method of the present invention, the sol-gel method for production of the starting material can be carried out by optionally using procedures which have widely been known in the field of the inorganic material chemistry. Accordingly, the detail description is omitted in this specification.

The production of the light-storing fluorescent pigment according to the present invention can be carried out through the following steps.

First step

An alkoxide derivative, an organic acid salt or an inorganic acid salt of metal elements constituting a mother crystal is dissolved in a polar organic solvent to obtain a homogeneous solution. Examples of the polar organic solvent, which can be used, include alcohols. If necessary, other organic solvents such as a glycol solvent, a non-polar solvent such as benzene, etc., an amine solvent and the like may also be used.

Second step

The reaction system of the homogeneous solution prepared in the first step is hydrolyzed by adding water, and then polycondensed. In this case, the reaction rate can be controlled by changing the pH of the reaction system and concentration of water. Ammonia water is preferably used in the adjustment of the pH because ammonia water does not remain as an impurity. As a result of the polycondensation, a sol solution is obtained from the homogeneous solution.

Third step

After preparing the sol solution, the resulting solution is allowed to stand as it is to naturally produce a gel solution. Alternatively, the sol solution may also be prepared by concentrating the resulting sol solution and controlling the pH.

Fourth step

The resulting gel solution is aged for a suitable time and then dried. As a result, a gel powder is obtained.

Fifth step

The resulting gel powder is calcined under predetermined conditions. This calcination is preferably carried out under a reducing atmosphere. This is because a deactivator as light emitting species, preferably europium, must be reduced from trivalent to divalent. Usually, the calcination is preferably carried out in two stages such as temporary calcination and subsequent proper calcination. The temperature of the temporary calcination can vary widely depending on factors such as kind of the mother crystal (constituent element or crystal system), but is preferably within a range from about 800 to 1500° C., and more preferably from about 900 to 1200° C. The temperature of the proper calcination can also vary widely depending on factors such as kind of the mother crystal (constituent element or crystal system), but is preferably within a range from about 800 to 1500° C., and more preferably from about 1000 to 1400° C. As a result of the calcination, a sintered powder of the mother crystal can be obtained. As the reducing atmosphere, for example, a mixture of nitrogen gas and carbon dioxide or a mixture of a nitrogen gas and hydrogen gas can be used.

The addition of the activator, coactivator, and alkoxide derivative, organic acid salt, inorganic acid salt, oxide and/or chloride of other additional elements for doping with the rare earth element may be conducted in an arbitrary stage of the above-described first to fifth steps. The substances to be added may be added at a time in one step, or may be portionwise added in each step. For example, the activator and coactivator may be added after preparing the sol solution in the second step, while the activator and coactivator may be added after preparing the gel powder in the fourth step. Alternatively, the activator and coactivator may be added during the calcination in the fifth step.

The method of the present invention can be easily carried out by using the above-described simplified steps. The resulting light-storing fluorescent pigment has high purity because the starting materials do not contain impurities and a step capable of being contaminated with impurities is not included during the production. In this light-storing fluorescent pigment, a fluorescent pigment having a desired composition, particle diameter and characteristics can be produced by optionally changing the composition and amount of the starting materials as well as reaction conditions, according to the desired results, without any difficulty.

The method of producing the light-storing fluorescent pigment using a sol-gel method of the present invention is a method of producing the light-storing fluorescent pigment by obtaining a gel powder through a homogeneous solution, a sol solution and a gel solution using a sol-gel method and calcining under a reducing atmosphere. When this production method is compared with the production method using a conventional solid state reaction method, both methods are different in simplification of purification of raw materials, reduction in calcination temperature, omission of a grinding step and omission of a classification step with respect to the production process. Both methods are different in that the resulting light-storing fluorescent pigment of the present invention is free from contamination with impurities and a crystal form of the mother crystal having desired high purity can be obtained under low-temperature calcination conditions. It becomes possible to control the particle diameter of the resulting pigment powder by selecting the sol-gel reaction conditions, thereby making it possible to obtain a light-storing fluorescent pigment having a particle diameter suited for conditions of subsequent coating step.

EXAMPLES

The present invention will be described with reference to examples thereof. It is appreciated that the present invention is not limited by these examples. Particularly, the production of the light-storing fluorescent pigment according to the present invention is not limited by the constituent elements and crystal form of the mother crystal of the fluorescent pigment as well as kind and concentration of the activator, coactivator and other additives to be added.

Example 1

0.02 mol (4.927 g) of aluminum tri(2-butoxide) was added to 40 ml of 2-ethoxyethanol, followed by stirring for 1 hour. Similarly, 0.01 mol (2.058 g) of strontium tri(2-propoxide) was added to 20 ml of 2-ethoxyethanol, followed by stirring for 1 hour. After mixing the resulting solutions, the mixed solution was refluxed at 130° C. for 17 hours. Subsequently, the temperature of the mixed solution was reduced to room temperature and 5.406 g of water was added for hydrolysis. After stirring for 30 minutes, a solution prepared by dissolving 0.00328 g of $Eu_2O_3$ (as activator) and 0.00325 g of $Dy_2O_3$ (as coactivator) in 2 g of nitric acid was added, followed by sufficient stirring. The resulting gel solution was aged at 60° C. for 24 hours. After the completion of the aging, the gel solution was dried at 150° C. As a result, a very brittle mass of gel powders acid was obtained. This mass was ground by a mortar and the resulting powder was temporarily calcined under a reducing atmosphere (atmosphere of nitrogen gas and carbon dioxide) at 1000° C. for 2 hours, and then properly calcined under the same atmosphere at 1300° C. for 2 hours. As a result, a sintered powder in accordance with the sol-gel method was obtained.

To evaluate whether the resulting sintered powder is a desired light-storing fluorescent pigment or not, the following evaluation test was conducted.

Figure 1:
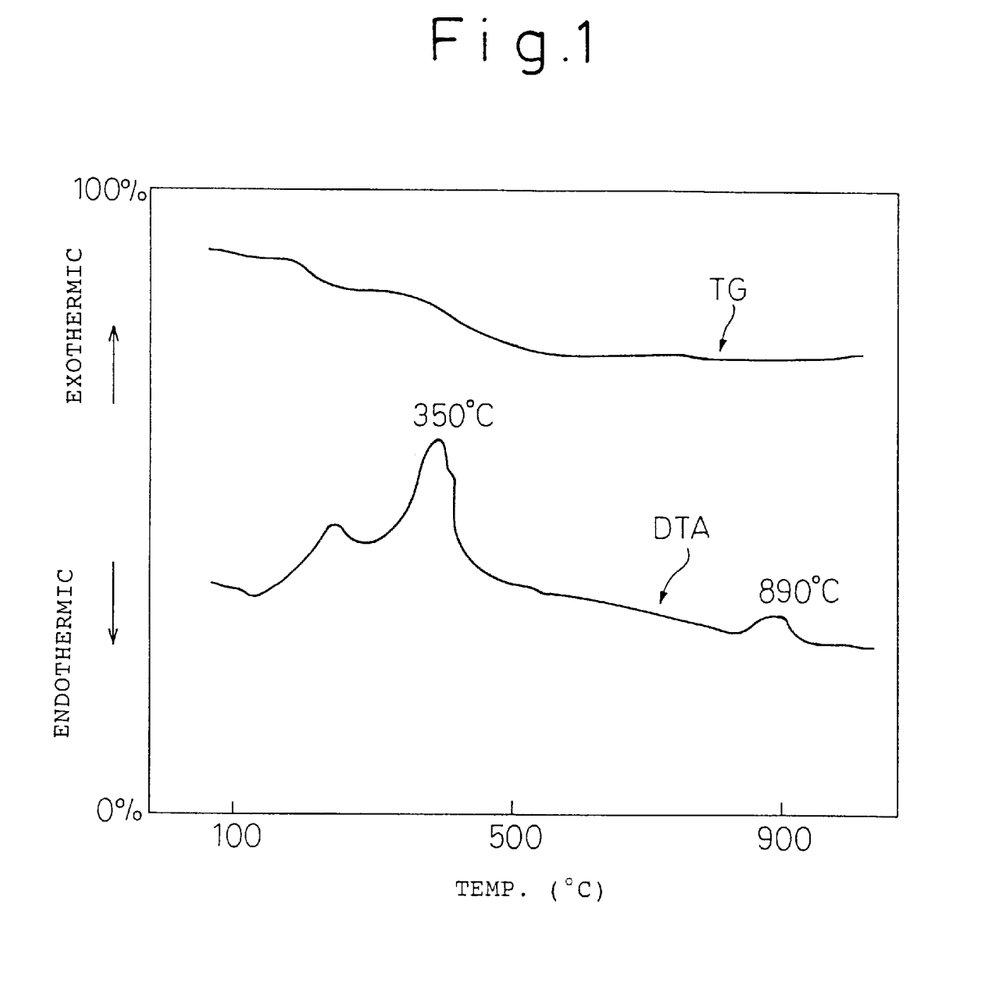
FIG. 1 is a graph showing measuring results of TG-DTA (thermogravimetric-differential scanning analysis) of the gel powder obtained in Example 1.

TG-DTA (thermogravimetric-differential scanning analysis):

The resulting gel powder was subjected to TG-DTA. As a result, the results as plotted in FIG. 1 were obtained. It was considered from the measured results of FIG. 1 that an exothermic peak recognized at about 120° C. is caused by evaporation of the solvent, whereas, an endothermic peak recognized at about 320–350° C. is caused by combustion of the organic matter. An endothermic peak, which is considered to show generation of crystallization, can be recognized at about 900° C.

Figure 2:
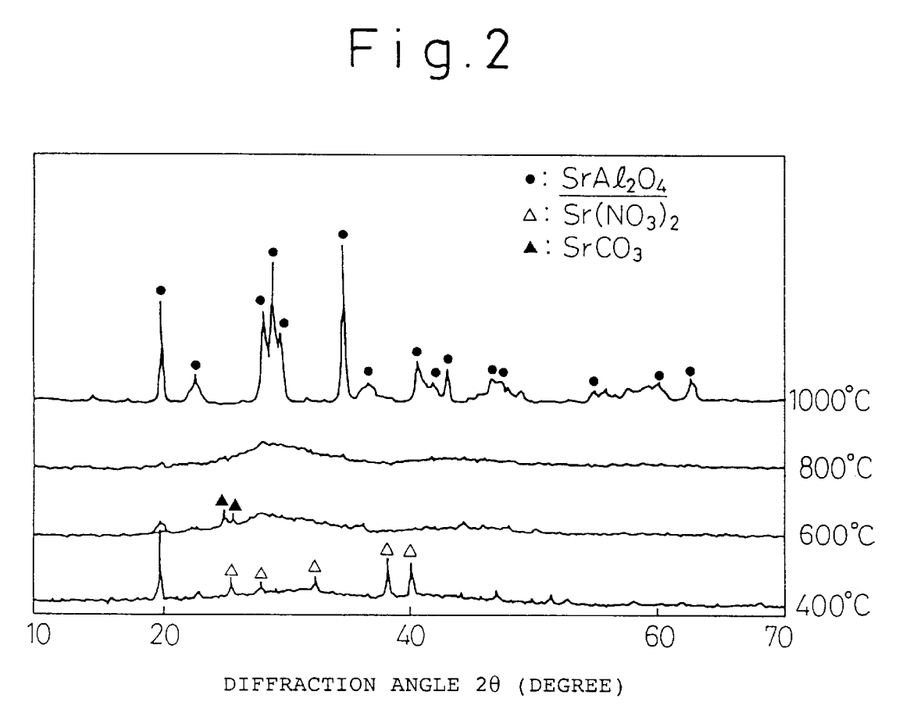
FIG. 2 is a graph showing a change in crystal form of the powder with a change in calcination temperature in the process of calcining the gel powder in Example 1 by XRD (X-ray diffraction method).
Figure 3:
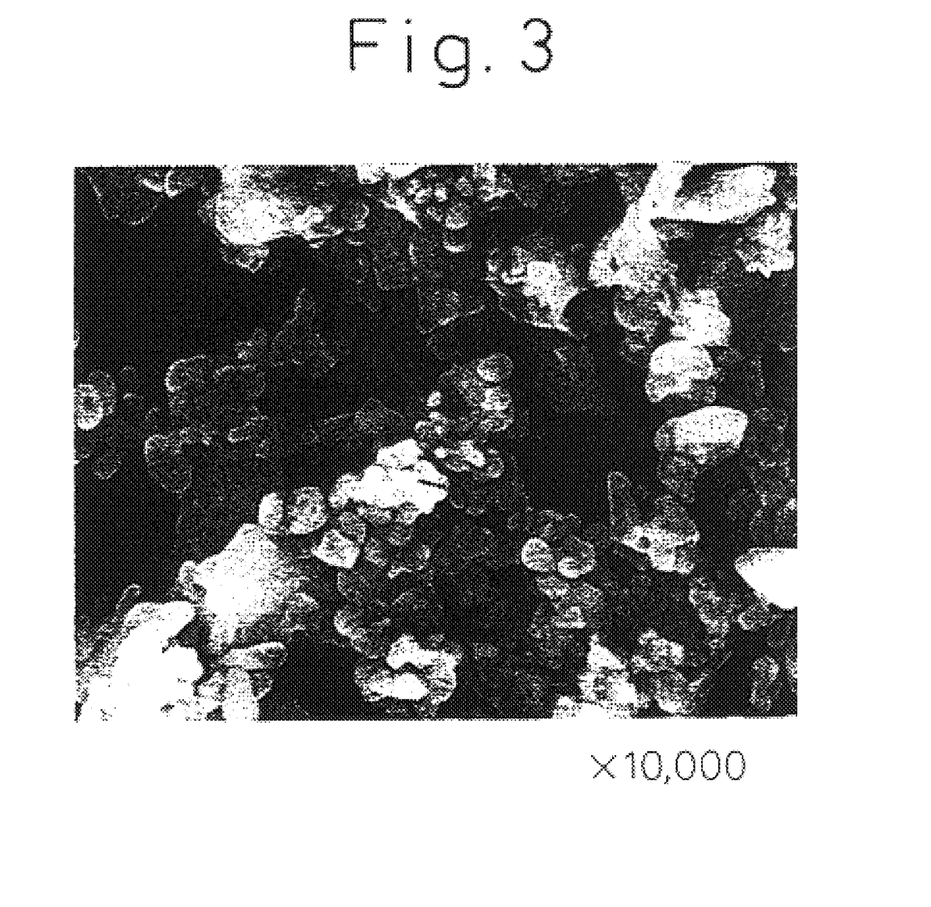
FIG. 3 is an electron micrograph (magnification: 10,000) of the light-storing fluorescent pigment powder obtained in Example 1.

XRD (X-ray diffraction method):

The gel powder was calcined at various calcination temperatures and the resulting sintered powder was subjected to XRD. As a result, the results as plotted in FIG. 2 were obtained. FIG. 2 shows a change in the XRD spectrum when the calcination temperature was changed to 400, 600, 800 and 1000° C., respectively. At the calcination temperature of 400 and 600° C., it is possible to recognize each peak of strontium nitrate and strontium carbonate, which are considered to be produced by reacting strontium as the constituent element of the mother crystal with nitric acid or carbon dioxide in an air. However, when the calcination temperature is raised to 800° C., the resulting powder becomes amorphous. When the calcination temperature is further raised to 1000° C., a $SrAl_2O_4$ crystal is present as a single phase. As is apparent from these results, the endothermic peak at about 900° C. in the graph of FIG. 1 described previously is caused by crystallization of $SrAl_2O_4$.

Figure 4:
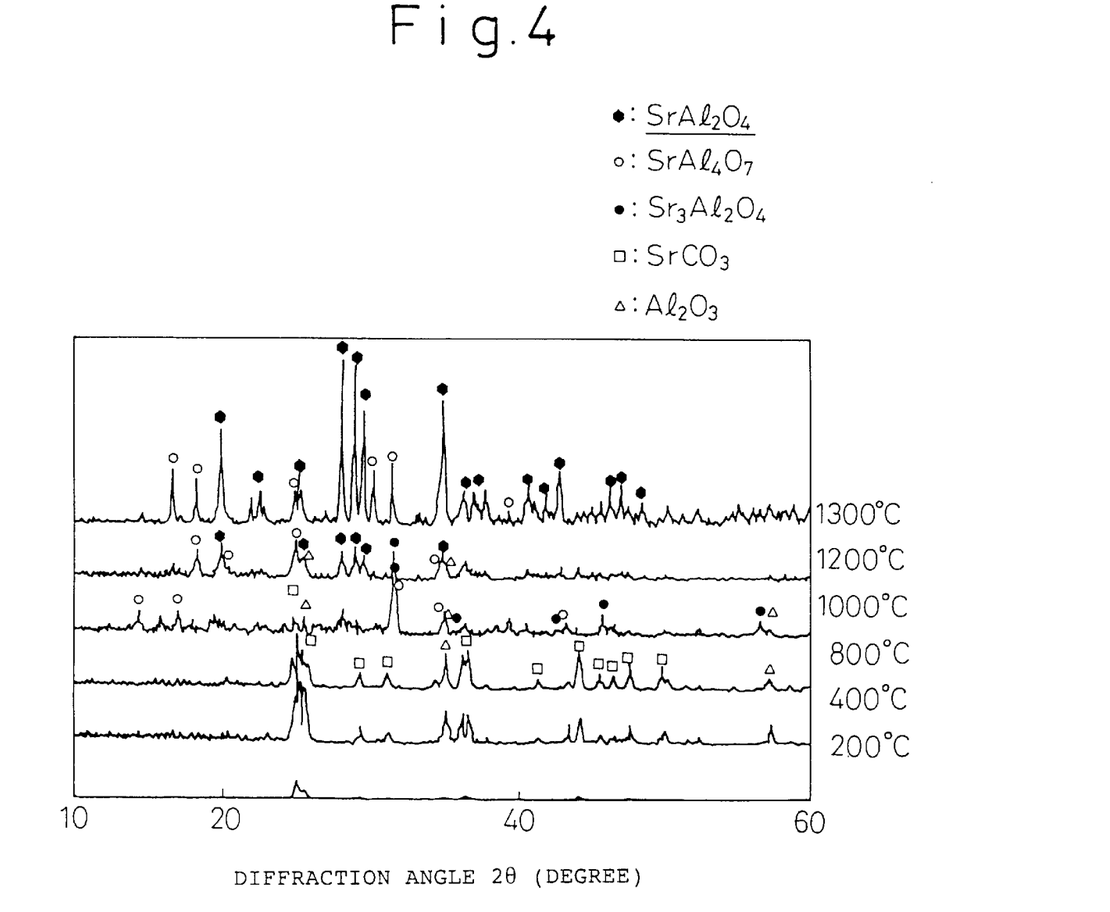
FIG. 4 is a graph showing a change in crystal form of the powder with a change in calcination temperature in the process of calcining the raw material powder in Comparative Example 1 by an XRD (X-ray diffraction) method.

Observation by electron microscope:

The resulting sintered powder in accordance with the sol-gel method was observed by an electron microscope (magnification: 10,000). As a result, it was found that it was a powder having a uniform particle diameter of about 0.4–0.8 μm, which particles had a smooth surface and a generally spherical shape. FIG. 4 is an electron micrograph (SEM) of this powder.

Comparative Example 1

In this example, a light-storing fluorescent pigment was prepared by a solid state reaction method.

0.01 mol (1.020 g) of α-aluminum oxide, 0.01 mol (1.476 g) of strontium carbonate, 0.00328 g of $Eu_2O_3$ (as activator) and 0.00325 g of $Dy_2O_3$ (as coactivator) were mixed by a mortar and the resulting powder was temporarily calcined under the same reducing atmosphere as in Example 1 at 1300° C. for 2 hours. The resulting calcined substance was ground by a ball mil and then mixed. Subsequently, the resultant was properly calcined under the same atmosphere as in the temporary calcination at 1300° C. for 2 hours. As a result, a sintered powder was obtained.

XRD (X-ray diffraction method):

The sintered powder obtained by sintering at various calcination temperatures using the solid state reaction method described above was subjected to XRD. As a result, the results as plotted in FIG. 4 were obtained. In FIG. 4, only a peak of aluminum oxide and strontium carbonate as the raw material was recognized at the calcination temperature of 400 and 600° C. Unlike the results plotted in FIG. 2 of Example 1, a $SrAl_2O_4$ crystal was not recognized at 1000° C. At 1300° C., the $SrAl_2O_4$ crystal was present as a principal phase, but it was recognized that $SrAl_4O_7$ coexists as a secondary phase.

Figure 5:
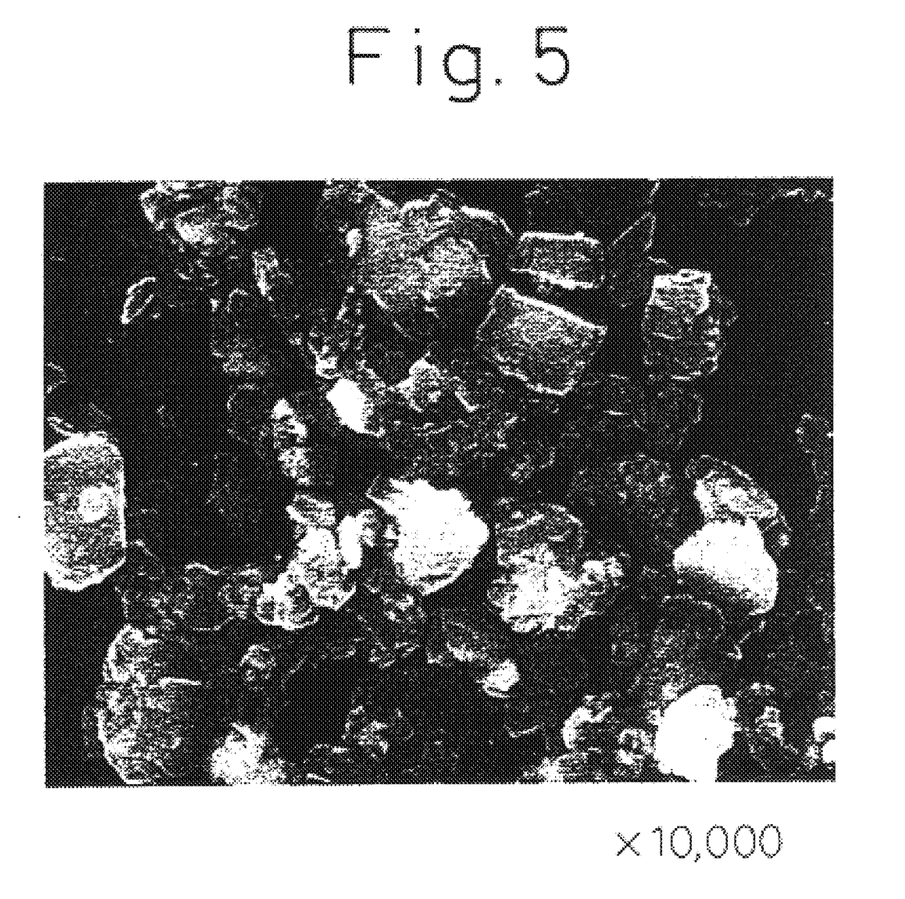
FIG. 5 is an electron micrograph (magnification: 10,000) of the light-storing fluorescent pigment powder obtained in Comparative Example 1.

Observation by electron microscope:

The resulting sintered powder was observed by an electron microscope (magnification: 10,000). As a result, unlike the gel powder of Example 1, a large difference in particle diameter between the respective powders was recognized (about 0.1 to 2 μm). The powder had a generally rectangular shape. FIG. 5 is an electron micrograph (SEM) of this powder.

Example 2

0.02 mol (4.927 g) of aluminum tri(2-butoxide) and 0.01 mol (2.058 g) of strontium tri(2-propoxide) were hydrolyzed in the same manner as in Example 1, followed by stirring at room temperature for 30 minutes. The resulting gel solution was aged at 60° C. for 24 hours. Then, the gel solution was dried at 150° C. As a result, a very brittle mass of gel powders was obtained. To this mass, 0.00328 g of $Eu_2O_3$ (as activator) and 0.00325 g of $Dy_2O_3$ (as coactivator) in 2 g of nitric acid were added, followed by mixing and further grinding by a mortar. The resulting powder was temporarily calcined under a reducing atmosphere (nitrogen gas atmosphere) at 1000° C. for 2 hours, and then properly calcined under the same atmosphere at 1300° C. for 2 hours. As a result, a sintered powder in accordance with the sol-gel method was obtained.

To evaluate whether the resulting sintered powder is a desired light-storing fluorescent pigment or not, the following evaluation test was conducted in the same manner as in Example 1.

XRD (X-ray diffraction method):

The resulting sintered powder was subjected to XRD. As a result, it was confirmed that a $SrAl_2O_4$ crystal was present as a single phase similar to Example 1.

Observation by electron microscope:

The resulting sintered powder was observed by an electron microscope (magnification: 10,000). As a result, it was found that it is a powder having a uniform particle diameter of about 0.4 to 0.8 μm, which particles had smooth surface and a generally spherical shape, similar to Example 1.

Example 3

Aluminum tri(2-butoxide) and strontium tri(2-propoxide) were hydrolyzed in the same manner as in Example 1, and then a gel powder was prepared from a gel solution. A mass of the gel powder was ground by a mortar and the resulting powder was temporarily calcined under the same reducing atmosphere as in Example 1 at 1000° C. for 2 hours. After the completion of the temporary calcination, 0.00328 g of $Eu_2O_3$ (as activator) and 0.00325 g of $Dy_2O_3$ (as coactivator) were added, followed by mixing and further grinding by a mortar. The resulting powder was temporarily calcined under the same reducing atmosphere at 1000° C. for 2 hours, and then properly calcined under the same atmosphere at 1300° C. for 2 hours. As a result, a sintered powder in accordance with the sol-gel method was obtained.

To evaluate whether the resulting sintered powder is a desired light-storing fluorescent pigment or not, the following evaluation test was conducted.

Figure 6:
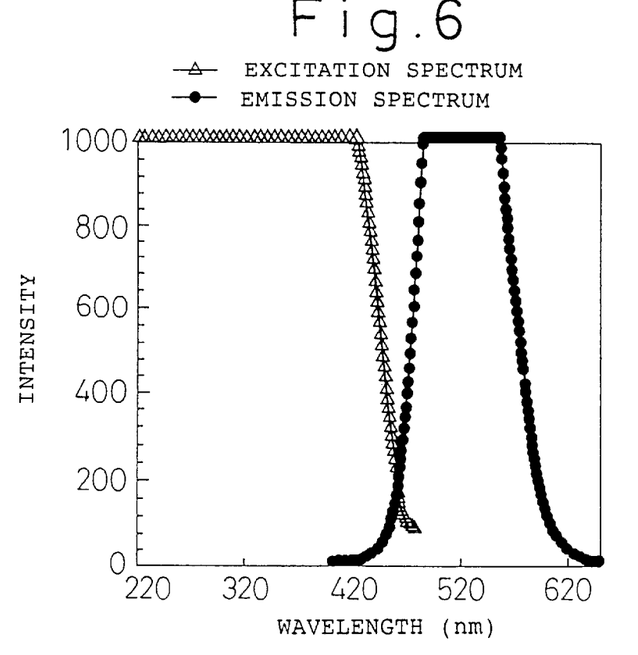
FIG. 6 is a graph showing excitation and emission spectrums of the light-storing fluorescent pigment powder obtained in Example 3.

First, excitation and emission spectrums of the resulting sintered powder were measured. As a result, the results as plotted in FIG. 6 were obtained. As is apparent from the measuring results of FIG. 6, the sintered powder obtained in this example has a wide excitation band ranging from 220 to 420 nm and exhibits an emission peak having λmax at about 510 nm.

Figure 7:
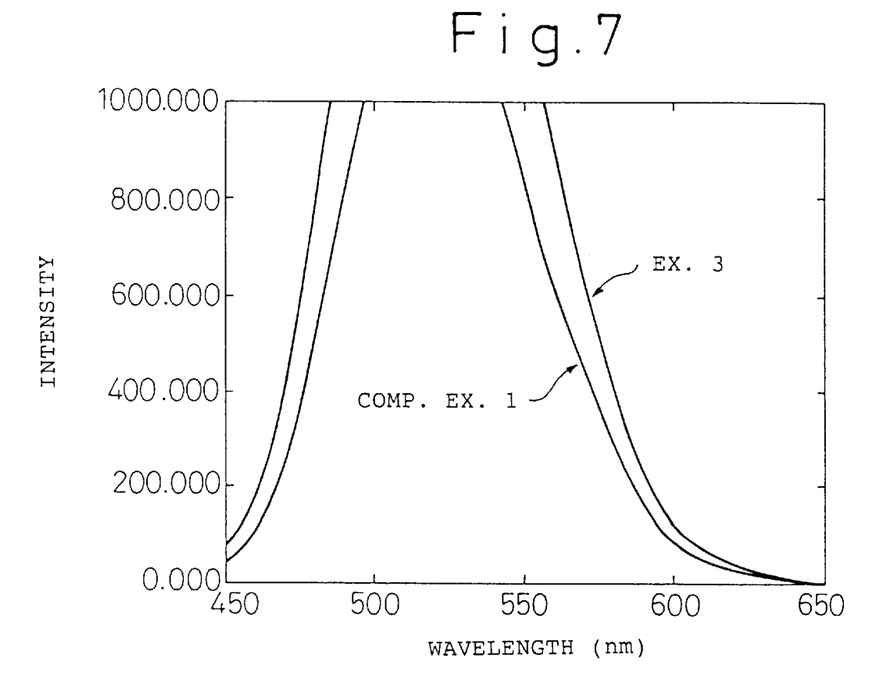
FIG. 7 is a graph showing an excitation spectrum when light-storing fluorescent pigment powders obtained in Example 3 and Comparative Example 1 are excited at 370 nm.

Then, the resulting sintered powder was excited at 370 nm and the emission spectrum at that time was measured. As a result, the results as plotted in FIG. 7 were obtained. In this figure, the emission spectrum excited at 370 nm of the powder obtained in Comparative Example 1 is also plotted for comparison. As is apparent from the measuring results of FIG. 7, both powders exhibit characteristics of the light-storing fluorescent pigment, but the powder obtained by the sol-gel method of this example is superior in light emitting intensity to the powder obtained in Comparative Example 1.

Figure 8:
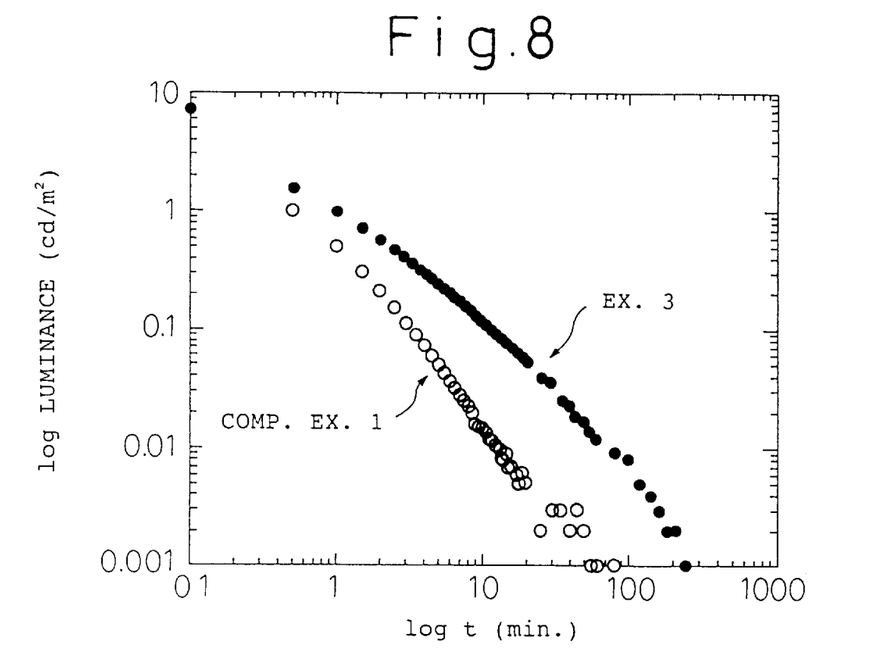
FIG. 8 is a graph showing a change in afterglow intensity of light-storing fluorescent pigment powders obtained in Example 3 and Comparative Example 1 after irradiation with light from a fluorescent lamp (1600 Lux, 20 minutes).

Furthermore, a change in afterglow intensity after irradiating the resulting sintered powder with light from a fluorescent lamp (1600 Lux, 20 minutes) was measured. As a result, the results as plotted in FIG. 8 were obtained. In this figure, a change in afterglow intensity of the powder obtained in Comparative Example 1 after irradiating with light from a fluorescent lamp (1600 Lux, 20 minutes) were also plotted for comparison. As is apparent from the measuring results of FIG. 8, both powders exhibit characteristics of the light-storing fluorescent pigment, but the powder obtained by the solgel method of this example is superior in afterglow characteristics to the powder obtained in Comparative Example 1.

Example 4

Aluminum tri(2-butoxide) and strontium tri(2-propoxide) were hydrolyzed in the same manner as in Example 1, and then a gel powder was prepared from a gel solution. A mass of the gel powder was ground by a mortar and the resulting powder was temporarily calcined under the same reducing atmosphere as in Example 1 at 1000° C. for 2 hours. After the completion of the temporary calcination, 0.0164 g of $Eu_2O_3$ (as activator) and 0.00325 g of $Dy_2O_3$ (as coactivator) were added, followed by mixing and further grinding by a mortar. The resulting powder was temporarily calcined under the same reducing atmosphere at 1000° C. for 2 hours, and then properly calcined under the same atmosphere at 1300° C. for 2 hours. As a result, a sintered powder in accordance with the sol-gel method was obtained.

Figure 9:
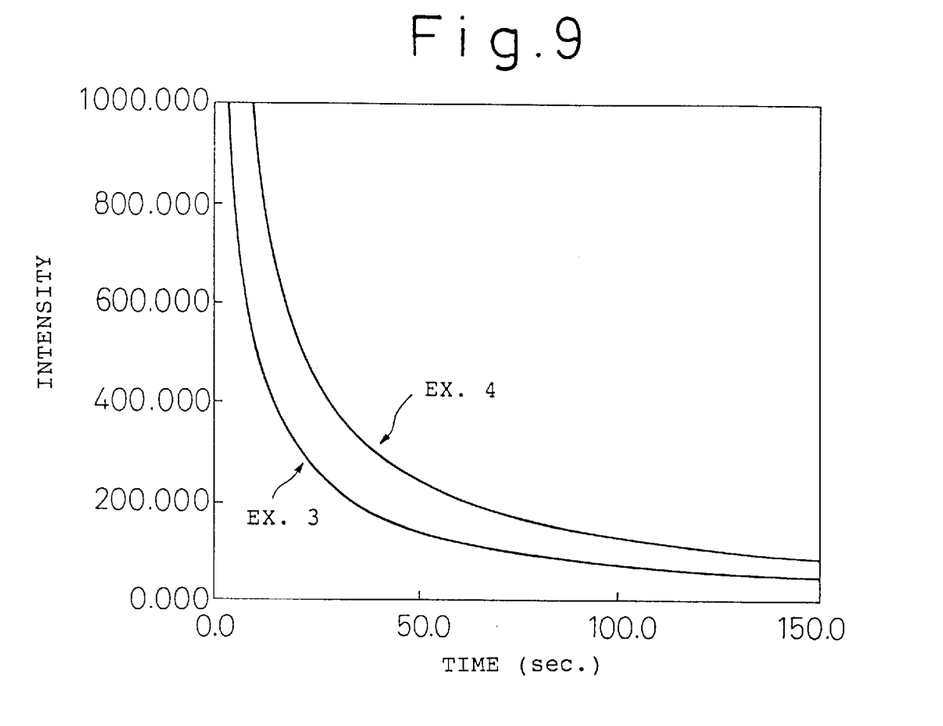
FIG. 9 is a graph showing a change in afterglow intensity when light-storing fluorescent pigment powders obtained in Example 3 and Example 4 are excited at 370 nm.

Then, a change in afterglow intensity when the resulting sintered powder was excited at 370 nm was measured. As a result, the results as plotted in FIG. 9 were obtained. In this figure, a change in afterglow intensity when the sintered powder obtained in Example 3 was excited at 370 nm was also plotted for comparison. As is apparent from the measuring results of FIG. 9, both powders exhibit good characteristics of the light-storing fluorescent pigment, but the afterglow characteristics can vary with a change in concentration of the activator and coactivator to be used. It has also been found that the light-storing fluorescent pigment obtained in this example is superior in initial luminance to that of Example 3.

Example 5

0.02 mol (4.927 g) of aluminum tri(2-butoxide) was added to 40 ml of butanol, followed by stirring for 2 hours. To the resulting solution, an aqueous solution prepared by dissolving 0.01 mol (2.147 g) of strontium acetate ½ $H_2O$ in 7.2 g of water was added, followed by mixing. The resulting solution was hydrolyzed by adding 20 g of an aqueous 28% ammonia solution. After stirring for 30 minutes, a solution prepared by dissolving 0.00328 g of $Eu_2O_3$ (as activator) and 0.00325 g of $Dy_2O_3$ (as coactivator) in 2 g of nitric acid was added, followed by sufficient stirring. The resulting gel solution was aged at 60° C. for 24 hours. After the completion of the aging, the gel solution was dried at 150° C. As a result, a very brittle mass of gel powders was obtained. This mass was ground by a mortar and the resulting powder was temporarily calcined under the same reducing atmosphere as in Example 1 at 1000° C. for 2 hours, and then properly calcined under the same atmosphere at 1300° C. for 2 hours. As a result, a sintered powder in accordance with the sol-gel method was obtained.

The shape, particle diameter and afterglow characteristics of the powder obtained as described above were the same as those of the powder obtained in Example 1.

Example 6

0.04 mol (9.854 g) of aluminum tri(2-butoxide) was added to 80 ml of 2-ethoxyethanol, followed by stirring for 5 hours. Similarly, 0.01 mol (2.058 g) of strontium tri(2- propoxide) was added to 20 ml of 2-ethoxyethanol, followed by stirring for 5 hours. After mixing the resulting solutions, the mixed solution was refluxed at 130° C. for 17 hours. Subsequently, the temperature of the mixed solution was returned to room temperature and 9.01 g of water was added for hydrolysis. The resulting gel solution was aged at 60° C. for 24 hours. After the completion of the aging, the gel solution was dried at 150° C. As a result, a very brittle mass of gel powders was obtained. This mass was ground by a mortar and the resulting powder was temporarily calcined under the same reducing atmosphere as in Example 1 at 1000° C. for 2 hours. After the completion of the temporary calcination, 0.0164 g of $Eu_2O_3$ (as activator) and 0.0065 g of $Dy_2O_3$ (as coactivator) were added, followed by mixing and further grinding by a mortar. The resulting powder was temporarily calcined under the same reducing atmosphere at 1000° C. for 2 hours, and then properly calcined under the same atmosphere at 1300° C. for 2 hours. As a result, a sintered powder made by a sol-gel method was obtained.

To evaluate whether the resulting sintered powder is a desired light-storing fluorescent pigment or not, the following evaluation test was conducted in the same manner as in Example 1.

A change in XRD spectrum at various calcination temperatures of the resulting gel powder was examined. As a result, it was recognized that the resulting powder becomes amorphous at the calcination temperature of 900° C. and a $SrAl_2O_4$ crystal and a $SrAl_4O_7$ crystal coexist at 1000° C. It was also recognized that a peak of the $SrAl_2O_4$ crystal disappears at a high temperature of not less than 1100° C. and the $SrAl_4O_7$ crystal is present as a single phase.

The emission spectrum when the resulting sintered powder was excited at 370 nm was measured and compared with that of the sintered powder obtained in Example 4. As a result of comparison, it was recognized that the powder of Example 4 exhibits a maximum emission peak at 508 nm, whereas, the powder of this example exhibits a maximum emission peak at 498 nm and a difference in emission spectrum is caused by a difference in crystal form of the mother crystal.

Figure 10:
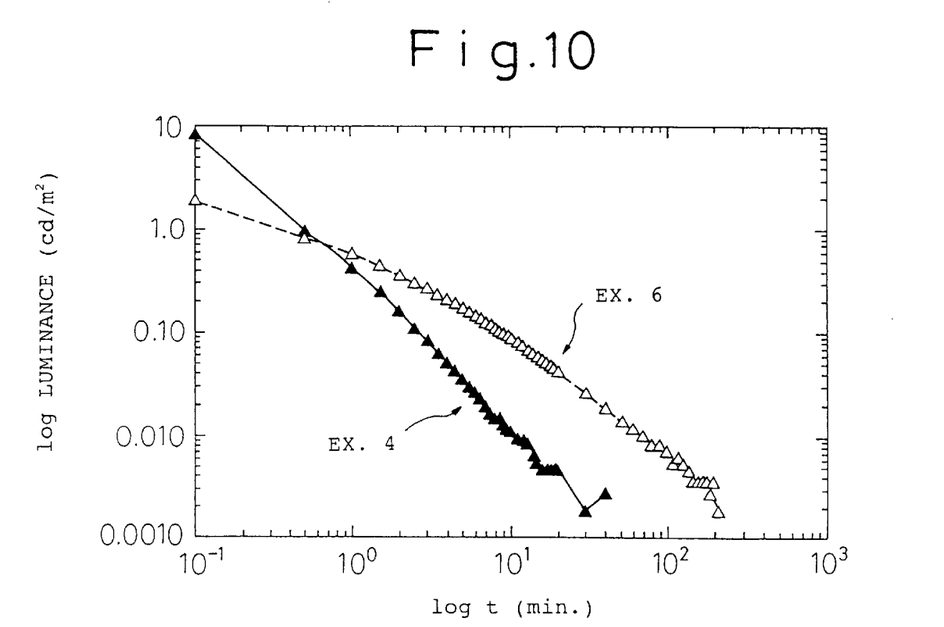
FIG. 10 is a graph showing afterglow characteristics of light-storing fluorescent pigment powders obtained in Example 4 and Example 6 after irradiation with light from a fluorescent lamp (1600 Lux, 20 minutes).

Furthermore, the afterglow characteristics after irradiating the resulting powder with light from a fluorescent lamp of 1600 Lux for 20 minutes were measured. As a result, the results as plotted in FIG. 10 were obtained. In FIG. 10, the afterglow characteristics of the powder obtained in Example 4 after irradiating with light from a fluorescent lamp of 1600 Lux for 20 minutes are also plotted for comparison. As is apparent from the measuring results of FIG. 10, the afterglow characteristics can vary with the crystal form of the mother crystal and the light-storing fluorescent pigment comprising the $SrAl_2O_4$ mother crystal obtained in Example 4 exhibits high initial luminance, whereas, the light-storing fluorescent pigment comprising the $SrAl_4O_7$ mother crystal obtained in this example is slightly inferior in initial luminance but is superior in afterglow characteristics.

According to the present invention, it is possible to obtain light-storing fluorescent pigments having different characteristics in high purity and it is possible to prepare the light-storing fluorescent pigment complying with required characteristics by separately producing these fluorescent pigments and mixing them.

Comparative Example 2

In this example, a light-storing fluorescent pigment was prepared by a solid phase reaction method.

0.02 mol (2.040 g) of α-aluminum oxide, 0.01 mol (1.476 g) of strontium carbonate, 0.0164 g of $Eu_2O_3$ (as activator) and 0.0065 g of $Dy_2O_3$ (as coactivator) were mixed by a mortar and the resulting powder was temporarily calcined under the same reducing atmosphere as in Example 1 at 1300° C. for 2 hours. The resulting calcined substance was ground by a ball mill and then mixed. Subsequently, the resultant was properly calcined under the same atmosphere as in the temporary calcination at 1300° C. for 2 hours. As a result, a sintered powder was obtained.

XRD (X-ray diffraction method):

The sintered powder obtained by sintering at various calcination temperatures using the solid state reaction method described above was subjected to XRD. As a result, unlike the case of Example 6, each peak of aluminum oxide, strontium carbonate and $Sr_3Al_2O_6$ as the raw material was recognized even when the calcination temperature was raised to 900° C. Even at the calcination temperature of 1200 to 1300° C. at which $SrAl_4O_7$ was obtained as a single phase, the $SrAl_4O_7$ crystal was not present as a principal phase and many crystals such as aluminum oxide, $Sr_3Al_2O_6$ and $SrAl_2O_4$ coexisted.

Subsequently, the emission spectrum when the powder obtained in this comparative example and powder obtained in Comparative Example 1 were excited at 370 nm was examined. As a result, since the mother crystal of the powders was not a single crystal phase, a difference in emission spectrum was not recognized.

Example 7

0.04 mol (9.854 g) of aluminum tri(2-butoxide) and 0.002 mol (0.292 g) of triethoxyboron were added to 80 ml of 2-ethoxyethanol, followed by stirring for 5 hours. Similarly, 0.01 mol (2.058 g) of strontium di(2-propoxide) was added to 20 ml of 2-ethoxyethanol, followed by stirring for 5 hours. After mixing the resulting solutions, the mixed solution was refluxed at 130° C. for 17 hours. Subsequently, the temperature of the mixed solution was returned to room temperature for hydrolysis and 9.01 g of water was added. The resulting gel solution was aged at 60° C. for 24 hours. After the completion of the aging, the gel solution was dried at 150° C. As a result, a very brittle mass of gel powders was obtained. This mass was ground by a mortar and the resulting powder was temporarily calcined under the same reducing atmosphere as in Example 1 at 1000° C. for 2 hours. After the completion of the temporary calcination, 0.0164 g of $Eu_2O_3$ (as activator) and 0.0065 g of $Dy_2O_3$ (as coactivator) were added, followed by mixing and further grinding by a mortar. The resulting powder was temporarily calcined under the same reducing atmosphere at 1000° C. for 2 hours, and then properly calcined under the same atmosphere at 1300° C. for 2 hours. As a result, a sintered powder in accordance with the sol-gel method was obtained.

Figure 11:
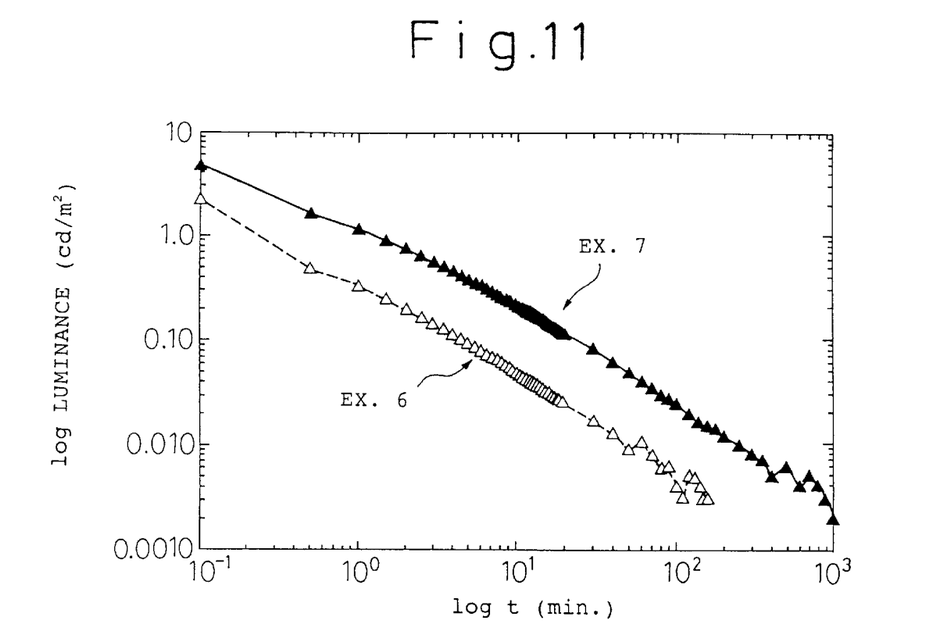
FIG. 11 is a graph showing afterglow characteristics of light-storing fluorescent pigment powders obtained in Example 6 and Example 7 after irradiation with light from a fluorescent lamp (1600 Lux, 20 minutes).

The afterglow characteristics after the resulting powder was irradiated with light from a fluorescent light of 1600 Lux for 20 minutes were measured. As a result, the results as plotted in FIG. 11 were obtained. In FIG. 11, the afterglow characteristics of the powders obtained in Example 6, after irradiating with light from a fluorescent lamp of 1600 Lux for 20 minutes, were also plotted for comparison. As is apparent from the measuring results of FIG. 11, the initial luminance and afterglow characteristics are also improved by adding elements other than the rare earth element as the activator and coactivator, with which the mother crystal is doped.

As is apparent from the above detailed description, according to the present invention, there can be obtained many noticeable effects which could not be obtained in a conventional light-storing fluorescent pigment.

First, the method for production of the light-storing fluorescent pigment of the present invention has effects such as simplification of the purification of raw materials, reduction in calcination temperature, omission of a grinding step and omission of a classifying step with respect to the production process in comparison with the method for production using a conventional solid state reaction method.

Since a sol-gel method is used in the production of the light-storing fluorescent pigment of the present invention, the resulting pigment is free from contamination with impurities and a crystal form having desired high purity can be obtained under low-temperature calcination conditions. It is particularly noticeable in the respect that the desired light-storing fluorescent pigment can be produced stoichiometrically from the starting material.

In the present invention, light-storing fluorescent pigments having different characteristics can be obtained in high purity and it becomes possible to prepare the light-storing fluorescent pigment complying with required characteristics by separately producing these fluorescent pigments and mixing them.

Furthermore, since fine pigment powders having uniform particle diameter can be produced in the production of the light-storing fluorescent pigment of the present invention, an additional refining step and a classifying step are not required in the case of printing on a dial by screen printing. Therefore, the operatability can be markedly improved.

Furthermore, in the production of the light-storing fluorescent pigment of the present invention, the particle diameter of the resulting pigment particles can be easily controlled by selecting the reaction conditions of the sol-gel method to be used, thereby making it possible to obtain a light-storing fluorescent pigment having the particle diameter suited for conditions of the subsequent coating step.

INDUSTRIAL APPLICABILITY

According to the present invention, not only the desired light-storing fluorescent pigment can be produced by the simplified production process, but also the resulting light-storing fluorescent pigment has high purity and it is possible to easily control the particle diameter of the pigment. Accordingly, according to the present invention, the resulting light-storing fluorescent pigment can be advantageously used as a display means of various apparatuses, measuring instruments and members because the freedom of the employment of the light-storing fluorescent pigment increases.

Describing in more detail, the light-storing fluorescent pigment of the present invention can be used by coating on the surface of various apparatuses, as a matter of course, and can be used by optionally mixing with various materials such as plastic, rubber, glass, etc. Specific application is not limited, but includes, for example, the dials of various measuring instruments, wristwatches, clocks, etc.; display signs such as traffic-control signs, safety signs, etc.; display an vehicles such as aircraft, automobiles, bicycles, etc.; and display an writing utensils, etc.

What is claimed is:

1. A light-storing fluorescent pigment for use as a display element comprising a mother crystal and a rare earth element with which said mother crystal is doped, said light-storing fluorescent pigment having been produced by calcining a gel powder as a starting material obtained from an arbitrary combination of an alkoxide derivative, an organic acid salt, an inorganic acid salt, an oxide and a chloride of metal elements constituting said pigment by using a sol-gel method, wherein the mother crystal is a metal oxide-based crystal containing at least two metal elements selected from the group consisting of aluminum, strontium, calcium and barium, and wherein at least one element selected from the group consisting of boron, copper and phosphorus is additionally used when doping with the rare earth metal is conducted.

2. A method of producing a light-storing fluorescent pigment for use as a display element, wherein the pigment contains a mother crystal and a rare earth element with which said mother crystal is doped, which method comprises the steps of:

producing a gel powder from an arbitrary combination of an alkoxide derivative, an organic acid salt, an inorganic acid salt, an oxide and a chloride of metal elements constituting said pigment by using a sol-gel method; and calcining the resulting gel under a reducing atmosphere, and in which method, the mother crystal is a metal oxide-based crystal containing at least two metal elements selected from the group consisting of aluminum, strontium, calcium and barium.

3. The method of producing a light-storing fluorescent pigment according to claim 2, wherein doping with the rare earth metal is conducted by using an activator and a coactivator.

4. The method of producing a light-storing fluorescent pigment according to claim 3, wherein the activator is europium.

5. The method of producing a light-storing fluorescent pigment according to claim 3, wherein the coactivator is at least one element selected from the group consisting of lanthanum, cerium, praseodymium, neodymium, samarium, gadolinium, terbium, dysprosium, holmium, erbium, thulium, ytterbium and lutetium.

6. The method of producing a light-storing fluorescent pigment according to claim 3, wherein at least one element selected from the group consisting of boron, copper and phosphorus is additionally used when doping with the rate earth metal is conducted.

* * * * *